US012603323B1

(12) United States Patent
Wang et al.

(10) Patent No.: US 12,603,323 B1
(45) Date of Patent: Apr. 14, 2026

(54) ELECTROLYTE ADDITIVE AND USE THEREOF IN SECONDARY LITHIUM BATTERIES

(71) Applicant: Automat Solutions, Inc., San Leandro, CA (US)

(72) Inventors: Xuejun Wang, Pleasanton, CA (US); Xiaoliang Wang, Alameda, CA (US); Ipshita Sahoo, San Jose, CA (US)

(73) Assignee: Automat Solutions, Inc., San Leandro, CA (US)

( * ) Notice: Subject to any disclaimer, the term of this patent is extended or adjusted under 35 U.S.C. 154(b) by 850 days.

(21) Appl. No.: 17/827,427

(22) Filed: May 27, 2022

Related U.S. Application Data

(60) Provisional application No. 63/194,848, filed on May 28, 2021.

(51) Int. Cl.
| | |
|---|---|
| *H01M 10/0567* | (2010.01) |
| *H01M 4/38* | (2006.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ....... *H01M 10/0567* (2013.01); *H01M 4/382* (2013.01); *H01M 4/505* (2013.01); *H01M 4/525* (2013.01); *H01M 10/0525* (2013.01); *H01M 2004/021* (2013.01); *H01M 2004/027* (2013.01); *H01M 2004/028* (2013.01); *H01M 2300/0025* (2013.01)

(58) Field of Classification Search
CPC .............. H01M 10/052–0525; H01M 10/0567
See application file for complete search history.

(56) References Cited

U.S. PATENT DOCUMENTS

| | | | | |
|---|---|---|---|---|
| 2008/0138704 A1* | 6/2008 | Mizuta | .................. | H01G 11/62 |
| | | | | 429/188 |
| 2011/0136019 A1* | 6/2011 | Amiruddin | ....... | H01M 10/0525 |
| | | | | 429/332 |
| 2011/0177398 A1* | 7/2011 | Affinito | ................. | H01M 4/134 |
| | | | | 429/231.95 |

FOREIGN PATENT DOCUMENTS

| | | | | | |
|---|---|---|---|---|---|
| EP | | 3168915 B1 * | 5/2017 | .......... | H01M 10/052 |
| EP | | 3240087 A1 * | 11/2017 | .......... | H01M 10/052 |
| WO | WO-2016196873 A1 * | | 12/2016 | .......... | H01M 10/052 |

OTHER PUBLICATIONS

Barron, John J. Ashton, Colin, The Effect of Temperature on Conductivity Measurement, 2005, Reagecon Diagnostics Ltd, 7(3), 1-5 (Year: 2005).*

(Continued)

*Primary Examiner* — Marla D McConnell
*Assistant Examiner* — Olivia A Jones
(74) *Attorney, Agent, or Firm* — Cognition IP, P.C.; Edward Steakley; Justin White

(57) ABSTRACT

The present invention discloses three classes of electrolyte additives for use in secondary lithium batteries. The secondary lithium battery may comprise a positive electrode, a negative electrode, an electrolyte, a porous separator between the positive and negative electrode, and an electrolyte additive. The electrolyte additive in the secondary lithium batteries may include non-lithium salts, inorganic fillers, and polymer additives. The use of electrolyte additives and combinations thereof improves the cell performance of secondary lithium batteries.

12 Claims, 16 Drawing Sheets

(56) References Cited

OTHER PUBLICATIONS

Shuang Liu, L. Xiong, C. He, Long cycle life lithium ion battery with lithium nickel cobalt manganese oxide (NCM) cathode, Journal of Power Sources, vol. 261, 2014, pp. 285-291, ISSN 0378-7753 (Year: 2014).*

Liu, J., Bao, Z., Cui, Y. et al. Pathways for practical high-energy long-cycling lithium metal batteries. Nat Energy 4, 180-186 (2019). https://doi.org/10.1038/s41560-019-0338-x (Year: 2019).*

Fangfang Yang, Dong Wang, Yang Zhao, Kwok-Leung Tsui, Suk Joo Bae, A study of the relationship between coulombic efficiency and capacity degradation of commercial lithium-ion batteries, Energy, vol. 145, 2018, pp. 486-495, ISSN 0360-5442 (Year: 2018).*

Xiao, J., Li, Q., Bi, Y. et al. Understanding and applying coulombic efficiency in lithium metal batteries. Nat Energy 5, 561-568 (2020). https://doi.org/10.1038/s41560-020-0648-z (Year: 2020).*

Li, J., Cui, Y., Zhang, S. et al. Potassium Hexafluorophosphate Additive Enables Stable Lithium-Sulfur Batteries. ACS Appl. Mater. Interfaces 2020, 12, 50, 56017-56026. (2020). https://doi.org/10.1021/acsami.0c17 406 (Year: 2020).*

Lin, H., Chen, Kh., Shuai, Y. et al. Influence of CsNO3 as electrolyte additive on electrochemical property of lithium anode in rechargeable battery. J. Cent. South Univ. 25, 719-728 (2018). https://doi.org/10.1007/s11771-018-3776-x (Year: 2018).*

Walls, H.J., et al. "Fumed silica-based composite polymer electrolytes: synthesis, rheology, and electrochemistry." Journal of Power Sources, 156-162. (2000):. (Year: 2000).*

* cited by examiner

| Metal | Reduction Half-Reaction | | | | | E°(V) |
|-------|---|---|---|---|---|---|
| Lithium | $Li^+$ | + | $e^-$ | → | Li(s) | − 3.04 |
| Cesium | $Cs^+$ | + | $e^-$ | → | Cs(S) | − 3.03 |
| Rubidium | $Rb^+$ | + | $e^-$ | → | Rb(s) | − 2.98 |
| Potassium | $K^+$ | + | $e^-$ | → | K(s) | − 2.93 |
| Barium | $Ba^{2+}$ | + | $2e^-$ | → | Ba(s) | − 2.91 |
| Strontium | $Sr^{2+}$ | + | $2e^-$ | → | Sr(s) | − 2.90 |
| Calcium | $Ca^{2+}$ | + | $2e^-$ | → | Ca(s) | − 2.87 |
| Sodium | $Na^+$ | + | $e^-$ | → | Na(s) | − 2.71 |
| Magnesium | $Mg^{2+}$ | + | $2e^-$ | → | Mg(s) | − 2.37 |
| Berium | $Be^{2+}$ | + | $2e^-$ | → | Be(s) | − 1.85 |
| Aluminum | $Al^{3+}$ | + | $3e^-$ | → | Al(s) | − 1.66 |
| Manganese | $Mn^{2+}$ | + | $2e^-$ | → | Mn(s) | − 1.18 |
| Zinc | $Zn^{2+}$ | + | $2e^-$ | → | Zn(s) | − 0.76 |
| Chromium | $Cr^{3+}$ | + | $3e^-$ | → | Cr(s) | − 0.74 |
| Iron | $Fe^{2+}$ | + | $2e^-$ | → | Fe(s) | − 0.44 |
| Cadmium | $Cd^{2+}$ | + | $2e^-$ | → | Cd(s) | − 0.40 |

FIG. 1

| Metal | Reduction Half-Reaction | | | | | E°(V) |
|---|---|---|---|---|---|---|
| Nickel | $Ni^{2+}$ | + | $2e^-$ | → | Ni(s) | − 0.25 |
| Tin | $Sn^{2+}$ | + | $2e^-$ | → | Sn(s) | − 0.13 |
| Lead | $Pb^{2+}$ | + | $2e^-$ | → | Pb(s) | − 0.13 |
| Hydrogen | $2H^+$ | + | $2e^-$ | → | $H_2(s)$ | 0.00 |
| Bismuth | $Bi^{3+}$ | + | $3e^-$ | → | Bi(s) | +0.32 |
| Copper | $Cu^{2+}$ | + | $2e^-$ | → | Cu(s) | +0.34 |
| Silver | $Ag^+$ | + | $e^-$ | → | Ag(s) | +0.80 |
| Mercury | $Hg_2^{2+}$ | + | $2e^-$ | → | 2Hg(l) | +0.80 |
| Mercury | $Hg^{2+}$ | + | $2e^-$ | → | Hg(l) | +0.85 |
| Palladium | $Pd^{2+}$ | + | $2e^-$ | → | Pd(s) | +0.91 |
| Platinum | $Pt^{2+}$ | + | $2e^-$ | → | Pt(s) | +1.19 |
| Cerium | $Ce^{4+}$ | + | $e^-$ | → | $Ce^{3+}(s)$ | +1.44 |
| Gold | $Au^+$ | + | $e^-$ | → | Au(s) | +1.83 |

FIG 1. (Continued)

Li||Cu: 1 mAh/cm² cycling; 50 cycles.

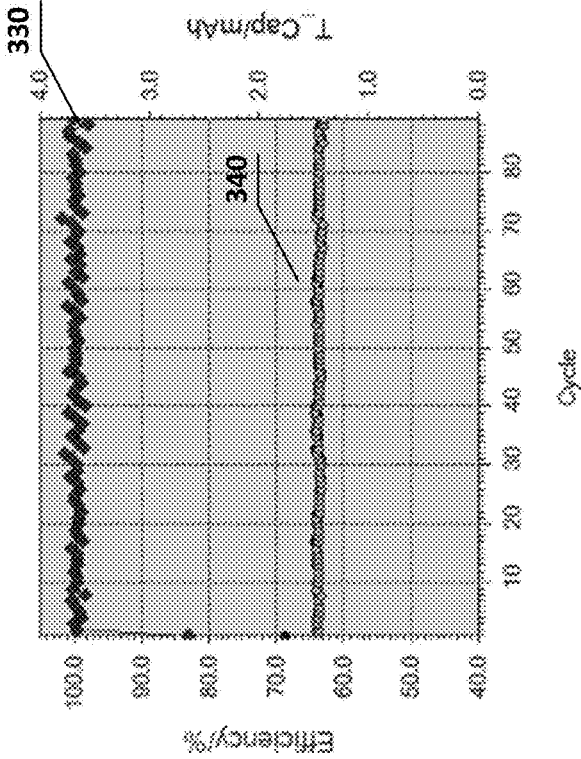
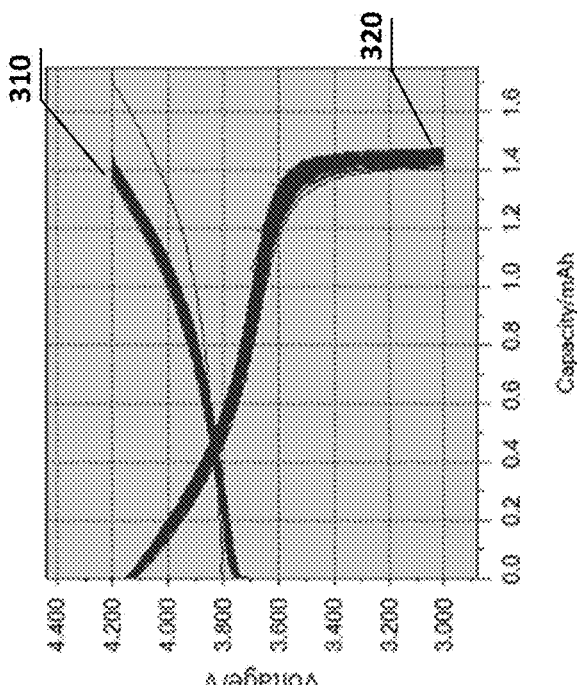
FIG. 3A

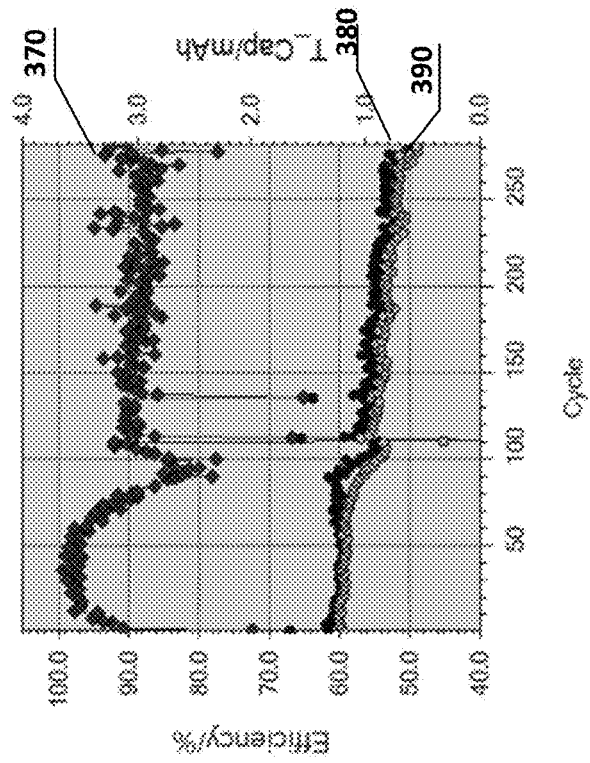
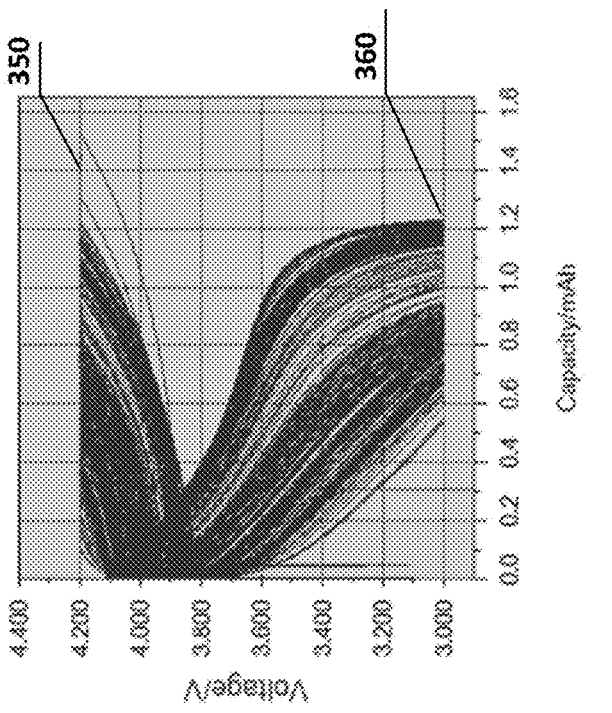
FIG. 3B

ELECTROLYTE ADDITIVE AND USE THEREOF IN SECONDARY LITHIUM BATTERIES

CROSS-REFERENCE TO RELATED APPLICATIONS

This application is a non-provisional application and claims the benefit of provisional U.S. Patent Application No. 63/194,848, filed May 28, 2021, and is hereby incorporated by reference in its entirety.

STATEMENT REGARDING FEDERALLY SPONSORED RESEARCH OR DEVELOPMENT

This invention was made with government support under DE-SC0020872 awarded by the Department of Energy. The government has certain rights in the invention.

BACKGROUND

This invention relates to the field of lithium batteries. More specifically, the present invention relates to improving the life cycle of lithium batteries through the use of novel electrolyte additives.

Along with the rapid development of smart electronic products and electric vehicles over recent years, further improvement is required on various components of lithium-ion and lithium-metal batteries. More specifically, increasingly high requirements have been imposed on battery life, cycle life, cost, and stability of secondary lithium batteries. Today, secondary lithium batteries have become an active area of development.

Lithium-ion batteries have been heavily researched in the development of portable electronics and electric vehicles. However, at high voltage, oxidative activity increases, and stability decreases for the materials forming the cathode. This increased oxidative activity may cause an electrolyte additive to experience electrochemical oxidation on the surface of the cathode and then further decompose into gasses. Lithium metal is a promising anode candidate for the next generation of rechargeable batteries due to its high theoretical specific capacity (3860 mAh g$^{-1}$), low density (0.59 g cm$^{-1}$), and lowest negative electrochemical potential. However, low Coulombic efficiency and formation of lithium dendrites hinder the practical application of lithium-metal batteries. Similar to lithium-ion batteries, at high voltage, stability decreases as oxidative activity increases for materials forming the positive electrode, or cathode. The use of novel electrolyte additives is one effective way to improve the specific energy, energy density, and battery life of the battery.

As a result, there is a need for development of novel, stable electrolyte additives to boost lithium battery specific energy, energy density, and improve cycle life of the battery electrode.

SUMMARY

Described herein is an innovative electrolyte additive directed toward secondary lithium batteries. According to one aspect of the present invention, an electrolyte additive is provided and may be used in the lithium-ion or lithium-metal battery. The electrolyte additive may comprise various compounds disclosed herein. An electrolyte additive described herein includes a non-lithium salt additive (Class One), an inorganic filler additive (Class Two), and a polymer additive (Class Three). The electrolyte additive may be selected from class one, class two, class three, and combinations thereof.

Lithium-metal batteries are batteries that contain metallic lithium ("Li") as a negative electrode, or anode. A lithium-metal battery is composed of electrodes/anodes, separators, and electrolytes. In some embodiments, the separator between the anode and cathode of the lithium-metal battery may be porous. In the present invention, the electrolyte may be added to the pores of the separator. In a preferred embodiment, the electrolyte additives are added to a liquid, non-aqueous electrolyte solution before the electrolyte is introduced into the lithium-metal battery.

Lithium-ion batteries are batteries that contain two electrodes and a separator. The electrodes are a positively charged cathode containing lithium cobalt oxide and a negatively charged anode usually containing graphite. In some embodiments, the separator between the anode and cathode of the lithium-ion battery may be porous, and the electrolyte may be added to the pores of the separator. In a preferred embodiment, the electrolyte additives may be added to a liquid, non-aqueous electrolyte solution before the electrolyte is introduced into the lithium-ion battery.

The stability of the electrolyte is an important factor in terms of the stability of the secondary lithium batteries as a whole. The development of advanced secondary lithium batteries depends not only on advancement of electrode chemistries, but also on the improvement of the electrolyte system for high ionic conductivity and controlled solid electrolyte interphase ("SEI") formulation. Applications of rechargeable Li metal batteries have been hindered by several issues. Li metal has high reactivity, and reacts with electrolytes to instantly form a SEI layer on the Li surface. Due to the poor mechanical properties, the SEI layer may not accommodate the large volume change of the Li layer and continuously breaks and repairs during cycling. The repeated breakage and repair results in low Coulombic efficiency ("CE"), leading to corrosion of the bulk Li. Further, Li metal protrusions may grow out of breaks in the SEI layer to form Li dendrites, which may cause short circuits and other safety hazards. Solid electrolyte interphase ("SEI") limits molecular access to the electrode surface and prevents the continuous electrochemical breakdown of electrolyte components. The physiochemical properties of the SEI are primarily governed by electrolyte composition and have an intense impact on the electrochemical cycling of metallic lithium. Thus, a well-formed SEI is crucial for the stable, long-term operation of secondary lithium batteries.

As outlined above, lithium-ion batteries contain two electrodes. Electrolyte solutions allow lithium ions to shuttle back and forth between the anode and the cathode when the battery is used or is being recharged. Lithium-metal batteries, on the other hand, may hold twice as much electricity per kilogram as today's conventional lithium-ion batteries. Lithium-metal batteries are able to achieve this by replacing the graphite anode with lithium metal, which may store significantly more energy. However, during operation of the lithium-metal battery, the lithium metal anode reacts with the electrolyte, causing the growth of lithium dendrites on the surface of the anode, which are potentially very dangerous. As a result, there is a need for developing electrolyte additives that enable the lithium-metal battery to boost specific energy, energy density, and improve the life cycle of the lithium-metal battery.

This invention is directed at three novel classes of additives for improved cell performance of a new class of high energy density ("HED") secondary lithium batteries. The electrolyte additives in the present disclosure may be in the form of a solid or liquid, non-aqueous solution.

Further areas of applicability of the present disclosure will become apparent from the detailed description, the claims, and the drawings. The detailed description and specific examples are intended for illustration only and are not intended to limit the scope of the disclosure.

In one embodiment there is a rechargeable secondary lithium battery. The secondary lithium battery includes a positive electrode, a negative electrode, and a porous separator between the positive electrode and negative electrode. The secondary lithium battery further includes an electrolyte with electrolyte additive. The electrolyte additive may include a non-lithium salt additive with potassium hexafluorophosphate, cesium nitrate and cesium carbonate, or a combination thereof. The concentration of the non-lithium salt additive may vary, and may be in a range from about 0.01% wt to about 5 wt % in the electrolyte. The secondary lithium battery may be characterized as having a discharge energy density of at least 300 Wh/kg when discharged from less than 4.4 V to greater than 2.8 V. The secondary lithium battery may be further characterized as having a cathode loading of 4 mAh/cm$^2$, and has a lithium anode thickness of 30 m. The secondary lithium battery may be further characterized as having an ionic conductivity of the electrolyte at 25° Celsius is 3-15 mSiemens/cm. Additional additives may be included as part of the electrolyte additive such as an inorganic filler additive made of a fumed silica. The concentration of the inorganic filler additive may be from about 0.01% wt to about 5 wt % in the electrolyte.

In another embodiment there is an electrolyte for a rechargeable secondary lithium battery. The electrolyte may include a lithium salt of lithium hexafluorophosphate and/or lithium trifluoromethylsulfonylimide. The electrolyte may include a solvent of dimethyl carbonate or ethylene carbonate. Additionally, the electrolyte may include a non-lithium salt additive of potassium hexafluorophosphate, cesium nitrate, cesium carbonate, or a combination thereof. The concentration of the non-lithium salt additive may be from about 0.01% wt to about 5 wt % in the electrolyte. Additional additives may be included as part of the electrolytes additive such as an inorganic filler additive made of a fumed silica. The concentration of the inorganic filler additive may be from about 0.01% wt to about 5 wt % in the electrolyte.

BRIEF DESCRIPTION OF THE DRAWINGS

The present disclosure will become better understood from the detailed description and the drawings, wherein:

FIG. 1 is a diagram illustrating Table 1 that displays the standard reduction potentials (E°) for selected metals.

FIG. 3A is a graph displaying improved cycle life with a cesium nitrate additive.

FIG. 3B is a graph displaying a baseline plot of the poor cycle life of a baseline electrolyte.

DETAILED DESCRIPTION

Figure 2A:
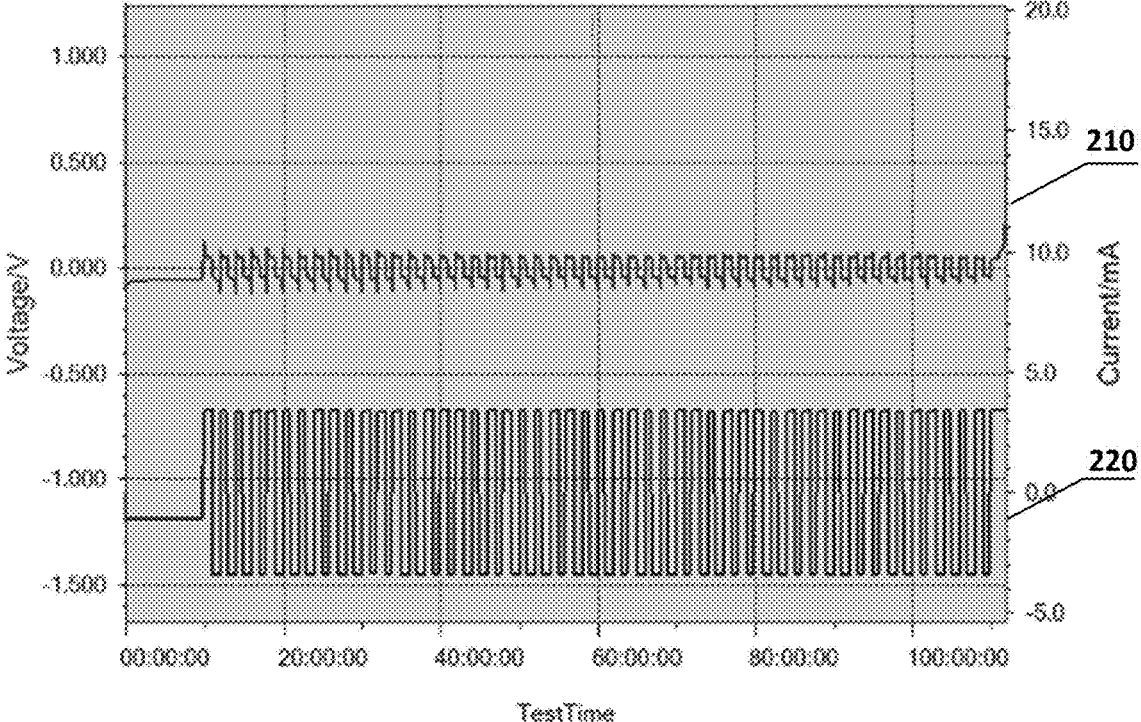
FIG. 2A is a baseline plot of coulombic efficiency.

The present disclosure provides a secondary lithium battery comprising a cathode, an anode, an electrolyte, a porous separator, and electrolyte additives.

Class One Additives

FIG. 1 is a diagram illustrating Table 1 that displays the standard reduction potentials (E°) for selected metals of Class One Additives. In the present invention, the electrolyte additives of Class One Additives include lithium salt additives and concentrations thereof.

In one aspect, Class One Additives include potassium salts. Potassium salt additives may include, for example, potassium nitrate, potassium carbonate, or potassium fluoride.

In a preferred embodiment, Class One Additives include cesium salts, for example, cesium nitrate, cesium carbonate, cesium fluoride, or cesium perchlorate.

In one aspect, Class One Additives may include potassium hexafluorophosphate, potassium perchlorate, or potassium tetrafluoroborate. Class One Additives may also include barium salts, for example, barium carbonate, barium fluoride, or barium phosphate, and calcium salts, for example, calcium carbonate, calcium fluoride, calcium nitrite, calcium oxalate, or calcium perchlorate. A broader selection of Class One Additives may further include sodium salts, magnesium salts, iron salts, and aluminum salts, selected from Table 1 in FIG. 1.

In some embodiments, the first class of additives are cesium hexafluorophosphate and lithium nitrate, which may improve the cycle life of secondary lithium batteries. The cycle life of a secondary lithium battery is defined as the number of charge and discharge cycles a battery can complete before losing performance. In some embodiments, the first class of salt additives of the present invention may improve the cycle life of the secondary lithium battery by forming a stable solid electrolyte interface ("SEI"). In some embodiments, the concentration of the first class of additives is equal or less than 5 wt % in the electrolyte.

In some ways, the effect of the Class One Additives is counterintuitive. Generally, for conventional liquid electrolytes in lithium-ion batteries, metal ions are poisonous to cycle life and are controlled at a level of less than <1 ppm. These poisonous metal ions may include sodium, calcium, iron, lead, copper, magnesium, zinc, chromium, nickel, cadmium, and magnesium. However, in the present invention, the effect of the first class of metal salts displayed a positive effect on the cycle life of the secondary lithium battery.

In a preferred embodiment, when the concentrations of cations of cesium ($Cs^+$) or lead ($Pb^+$) is less than 5 wt % in the electrolyte, their effective reduction potentials are close to that of lithium ($Li^+$) at higher concentrations. During lithium plating, the cesium may form a shield on lithium dendrite, and prevent the dendrite from growing.

Example 1

Potassium Hexafluorophosphate

In some embodiments, potassium hexafluorophosphate additives improve lithium plating, lithium stripping, and coulombic efficiency. Lithium plating describes the process by which electrons build on the surface of the electrode as a result of being unable to move into intercalation sites. Lithium stripping describes the removal process of lithium ions from the anode during discharge. Coulombic efficiency describes the charge efficiency by which electrons are transferred between the anode and cathode during charging and discharging of the battery.

In some embodiments, for lithium cycling stability, the testing protocol includes three steps:

(1) Plating 10 $mA/cm^2$ of lithium onto the Cu electrode, at 1 $mA/cm^2$;

(2) Cycling the Li/Cu cell 50 cycles, at 3 $mA/cm^2$; and (3) Stripping the lithium from the Cu electrode to 1V, at 3 $mA/cm^2$ Where the lithium coulombic efficiency ("LCE") may be calculated by Formula I:

$$LCE = \frac{\sum_{i=1}^{51} Q_{c,i}}{\sum_{i=1}^{51} Q_{d,i}} \qquad \text{Formula I}$$

where $Q_c$ represents the stripping capacity of each cycle and $Q_d$ represents the plating capacity of each cycle. In addition, $Q_{d,0}$ represents the plating capacity during the initial step of plating 10 $mA/cm^2$ of lithium onto the Cu electrode. $Q_{c,51}$ represents the stripping capacity during the final step of stripping lithium from the Cu electrode to 1V.

FIG. 2A demonstrates an example baseline lithium coulombic efficiency test plot. The test protocol change in voltage (V) over time during cycling is demonstrated by line 210. The test protocol change in current (mA) over time during cycling is demonstrated by line 220. During testing, the current is controlled and voltage is recorded. As the secondary lithium battery passes current, the current may be translated into capacity. The efficiency demonstrated during cycling in FIG. 2A comprises two steps: 1) lithium plating and 2) lithium stripping.

Figure 2B:
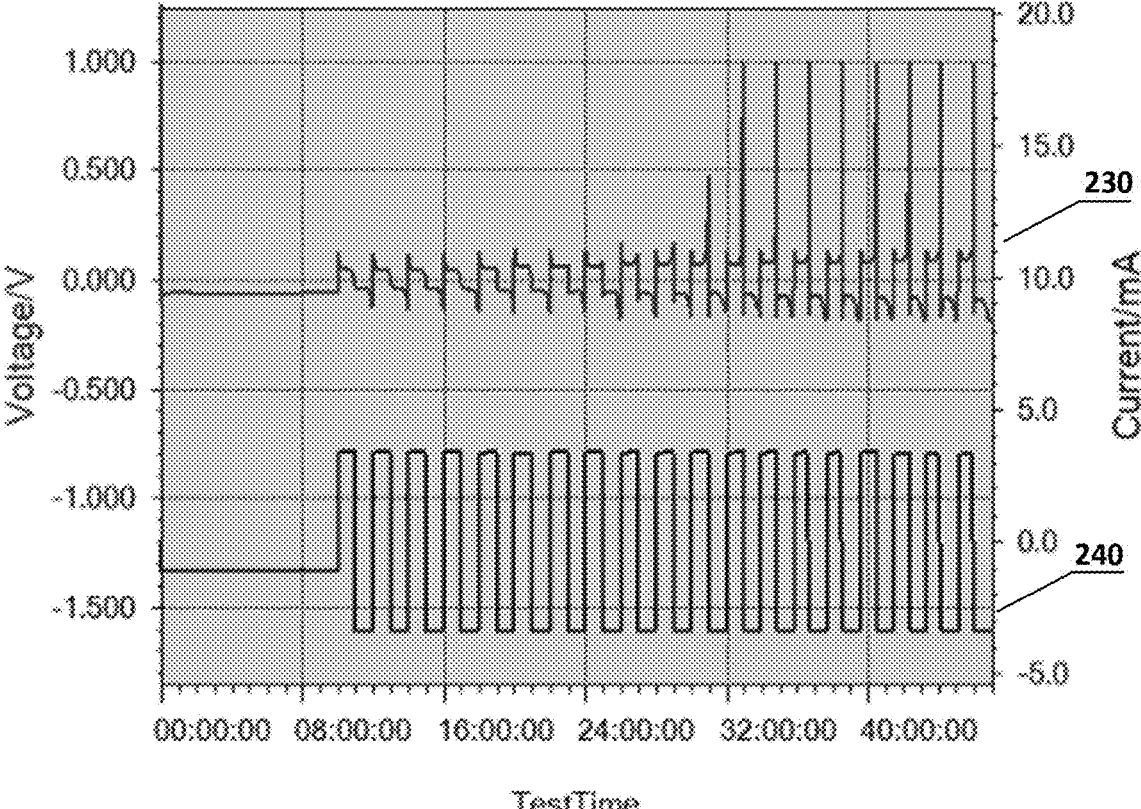
FIG. 2B is a plot of the coulombic efficiency of one electrolyte embodiment.

FIG. 2B demonstrates the resulting lithium coulombic efficiency of a baseline electrolyte. The baseline electrolyte is composed of 1.0M of lithium hexafluorophosphate (LiPF6) ethylene carbonate (EC)/dimethyl carbonate (DMC)/diethyl carbonate (DEC) 4/2/4 v/v 2 wt % vinylene carbonate (VC) additional. The change in the voltage (V) over time during cycling is demonstrated by line 230. The change in current (mA) over time during cycling is demonstrated by line 240.

In one aspect, for a Li/Cu cell cycling at 2 $mA/cm^2$ with a lithium anode thickness of 100 μm, an average LCE of 99.1% corresponds to 1059 cycles in a Li/Cu cell. These values are calculated using the following information. The total available capacity of the lithium anode is 20.66 $mAh/cm^2$, of which 19.06 $mAh/cm^2$ may be lost due to irreversibility before the cell capacity drops below 1.6 $mAh/cm^2$, which represents 80% of the initial capacity of the lithium anode. For an average LCE of 99.1%, the capacity loss is 0.018 $mAh/cm^2$ per cycle. Therefore, it takes 1059 cycles to consume 19.06 $mAh/cm^2$ before cell capacity drops below 80% of the initial capacity, based on the calculation of Formula I above.

During development, the baseline electrolyte demonstrated an average LCE of 76.7%. As shown in FIG. 2B, the voltage during the lithium stripping step spiked and reached a cutoff voltage of 1V at cycle 11, indicating the loss in lithium capacity was significant during the first 11 cycles.

Figure 2C:
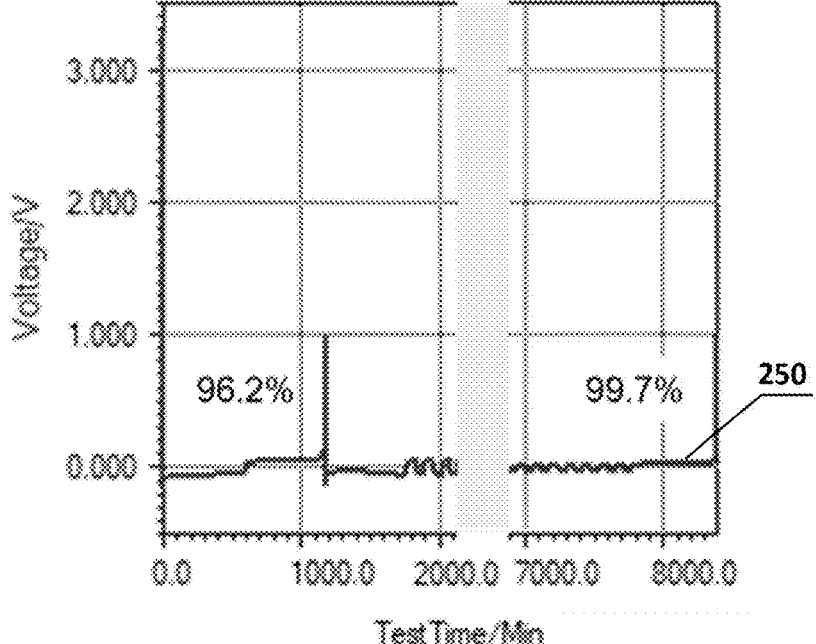
FIG. 2C is a plot of the coulombic efficiency of one electrolyte embodiment.

FIG. 2C demonstrates another graph depicting example testing of a Li/CU cell cycling at 1 $mAh/Cm^2$ at 50 cycles for a period of over 8000 minutes. The example graph depicts line 250 illustrating a lithium coulombic efficiency (Li∥Cu) of about of 96.2% to 99.7%. A gap in the graph shows the test time jumping from 2000 minutes to 7000 minutes.

Example 2

Cesium Nitrate Additive of a Lithium-Metal Battery NCM111/Li

FIG. 3A demonstrates an improved Lithium Nickel Cobalt Manganese Oxide "NCM111/Li") cycle life with a cesium nitrate additive. The upward curve, line 310 demonstrates the charging profile of voltage (V) versus capacity (mAh) during cycling. The downward curve, line 320 demonstrates the discharge profile of voltage (V) versus capacity (mAh) during cycling. Lines 310 and 320 demonstrate minimal change in the voltage (V) versus capacity (mAh) over many cycles, indicating improved cycle life of NCM111/Li with a cesium nitrate additive. Line 330 demonstrates stable coulombic efficiency (%) over each cycle. Line 340 demonstrates stable capacity (mAh) over each cycle.

FIG. 3B demonstrates poor NCM111/Li cycle life with a baseline electrolyte. The upward curve, line 350 demonstrates the charging profile of voltage (V) versus capacity (mAh) during cycling. The downward curve, line 360 demonstrates the discharge profile of voltage (V) versus capacity (mAh) during cycling. Lines 350 and 360 demonstrate shifting of voltage (V) versus capacity (mAh) plots, indicating degradation of capacity with a baseline electrolyte. Line 370 demonstrates a decrease in coulombic efficiency (%) over each cycle. Line 380 demonstrates a decrease in coulombic efficiency (%) over each cycle. Line 390 demonstrates a decrease in initial capacity (mAh) over each cycle.

As demonstrated in FIG. 3B, an electrolyte with 3 wt % cesium nitrate has stable full cycling in a coin cell configuration. After 90 cycles, the coulombic efficiency was stable at about 100%. The cell capacity retention was 97.2% at 90 cycles. The initial coulombic efficiency was 83.0%. In coin cell testing, the active cathode material is NCM111. The cathode loading is 1.5 $mAh/cm^2$. The electrolyte loading is 0.2 g/mAh. The lithium thickness is 100 μm.

As shown in FIG. 3B, the coulombic efficiency of the baseline electrolyte, as calculated in Formula I did not reach 100%, and started to dip after 50 cycles, as indicated by line 370. At cycle 96, the capacity fell below 80% of the initial capacity. The cell capacity retention was 45.0% at cycle 282, as indicated by line 390. The initial coulombic efficiency was 72.7%, as indicated by line 370.

Figure 3C:
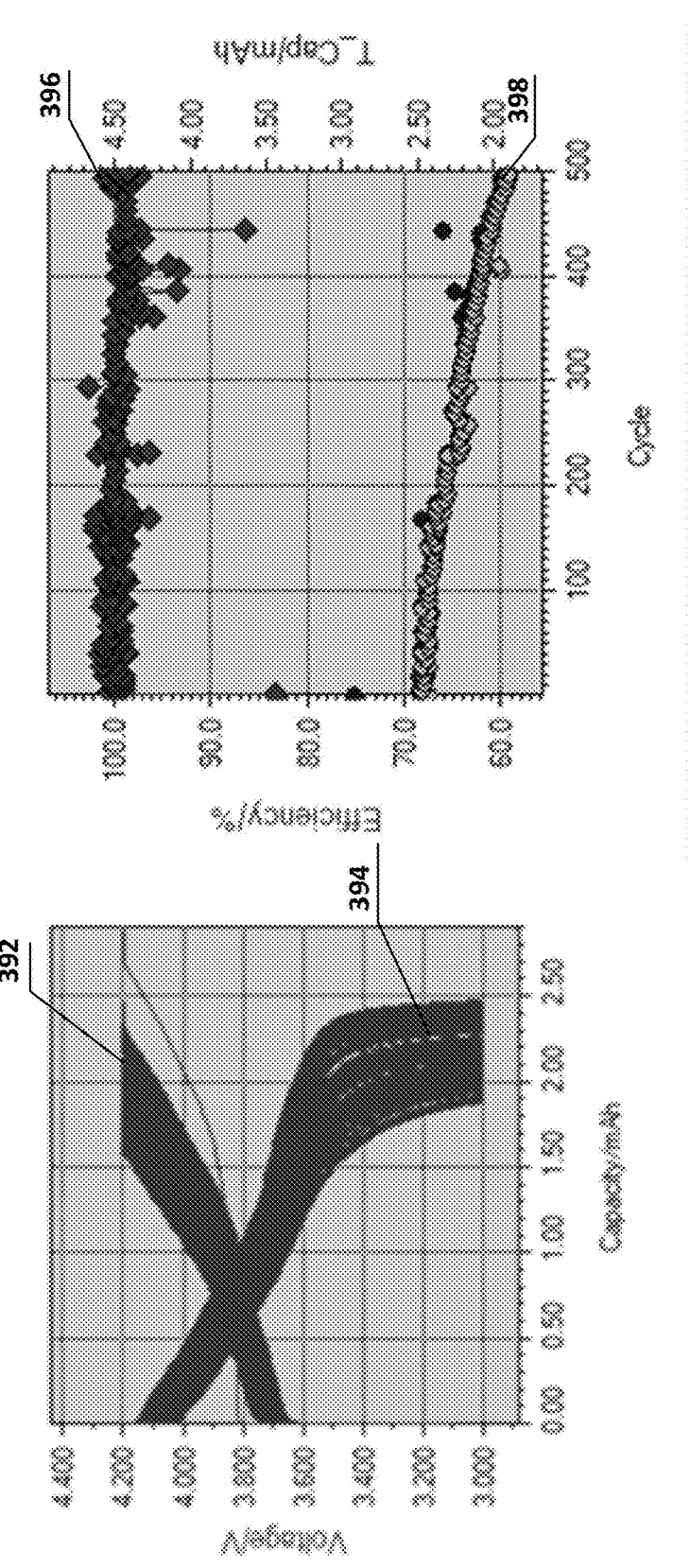
FIG. 3C is a graph displaying improved cycle life with a cesium nitrate additive.

FIG. 3C demonstrates an improved NCM111/Li cycle life with a cesium nitrate additive. The upward curve, line 392 demonstrates the charging profile of voltage (V) versus capacity (mAh) during cycling. The downward curve, line 394 demonstrates the discharge profile of voltage (V) versus capacity (mAh) during cycling. Lines 392 and 394 demonstrate minimal change in the voltage (V) versus capacity (mAh) over many cycles (e.g., 500 cycles), indicating improved cycle life of NCM111/Li with a cesium nitrate additive. Line 396 demonstrates stable coulombic efficiency (%) over each cycle. Line 398 demonstrates stable capacity (mAh) over each cycle. The graph illustrates a slight capacity drop over the coarse of the cycling. In the example, the capacity remains at least at 80% of the original capacity of the cell.

Class Two Additives

In the present invention, the electrolyte additives of Class Two Additives include inorganic filler additives on the nano and submicron scale, and concentrations thereof. In some embodiments, Class Two Additives include silica, alumina, lithium aluminate, and montmorillonite. In some embodiments, the surface area of silica may be 50-1000 $m^2/g$ with a particle size of 3-100 nm. The surface of silica may be hydrophilic (—OH) or hydrophobic (—OCH3). In some embodiments, Class Two Additives include inorganic oxides, complex oxides, and ceramic powders. In a preferred embodiment, Class Two Additives may be dispersed in the electrolyte and serve as a physical barrier to prevent lithium dendrite from growing over the porous separator and spreading from the anode to the cathode. Class Two Additives improve the cycle life of secondary lithium batteries by physically blocking lithium dendrite formation in the electrolyte. Lithium dendrite is formed when lithium-ions accumulate on the anode surface, leading to short circuits and other catastrophic failures.

Figure 4A:
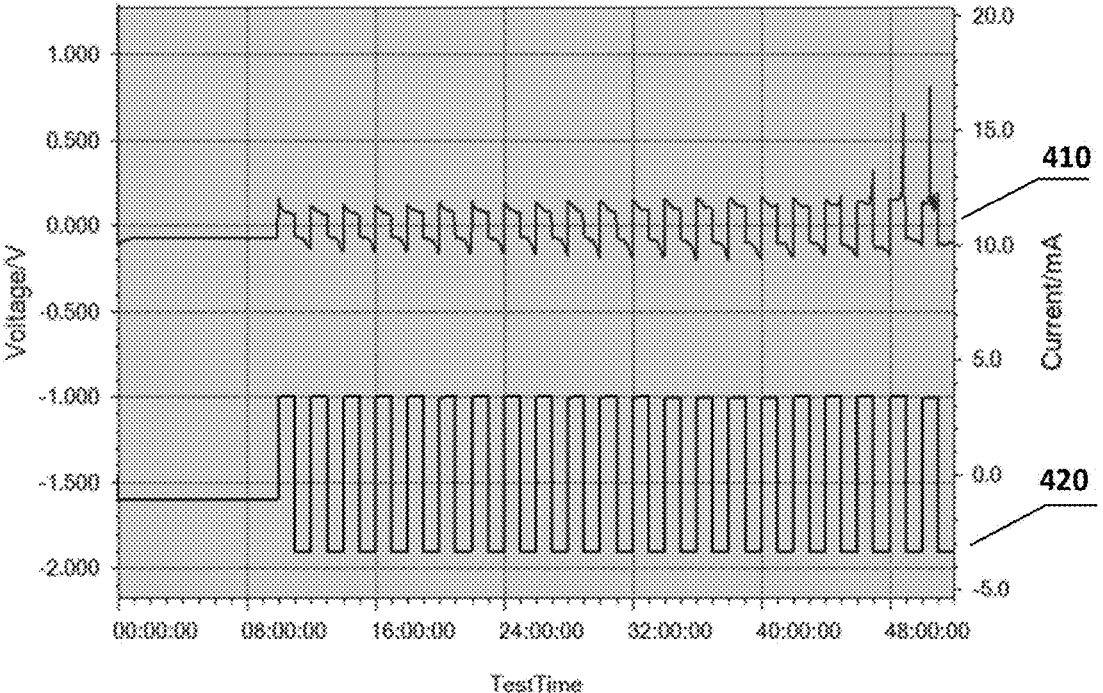
FIG. 4A is a graph displaying the lithium coulombic efficiency of an electrolyte with silica additive.

FIG. 4A displays a graph of voltage (V) and current (mA) over time, demonstrating the lithium coulombic efficiency of an electrolyte with silica additive. In some embodiments, the electrolyte with 0.5 wt % of silica demonstrates an improved average lithium coulombic efficiency of 84.4%. The change in the voltage (V) over time for an electrolyte with 0.5 wt % of silica additive during cycling is demonstrated by line 410. The change in current (mA) over time for an electrolyte with 0.5 wt % of silica additive during cycling is demonstrated by line 420. In some embodiments, may range from 0.5 wt % to 1 wt %.

Figure 4B:
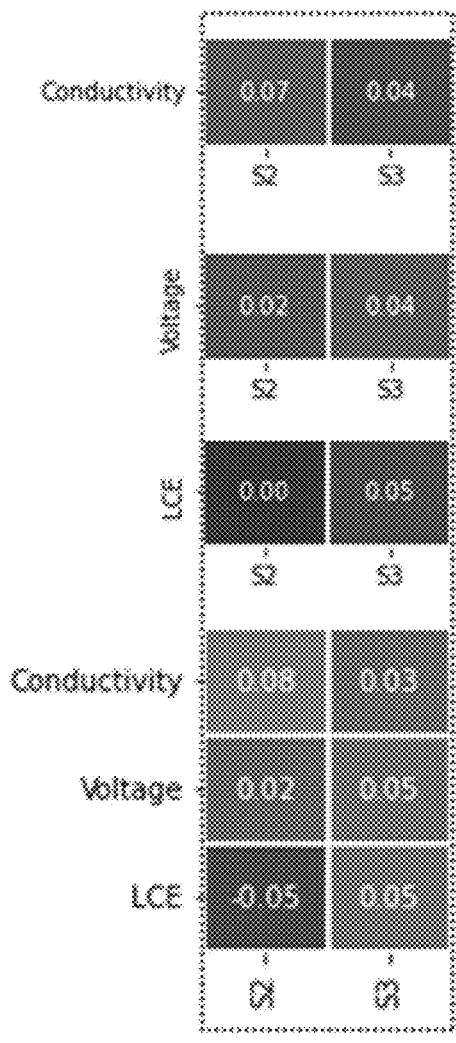
FIG. 4B is a graph depicting a summary table of conductivity, voltage and lithium columbic efficiency values.

FIG. 4B is a graph depicting a summary table of conductivity, voltage and lithium columbic efficiency values. The values in the squares of the table measure the degree of positive effect of example silica additives S2 and S3. In the top half of the table, by adding the silica additive S2 to an electrolyte, the conductivity result is improved by 7%, the voltage is improved by 2%, and the LCE is unchanged. By adding the silica additive S3 to an electrolyte, the conductivity result is improved by 4%, the voltage is improved by 4%, and the LCE is improved by 4%. In the bottom half of the table, a different method was used to calculate the positive effect. In this example, by adding the silica additive S2 to an electrolyte, the conductivity result was improved by 8%, the voltage is improved by 2% and the LCE is decreased by 5%. By adding the silica additive S3, the conductivity is improved by 3%, the voltage is improved by 5%, and the LCE is improved by 5%. These silica additives S2 and S3 for example, may be hydrophilic fumed silica or hydrophobic fumed silica. The table is meant to illustrate the positive effective of adding silica additives to electrolytes.

Figure 5:
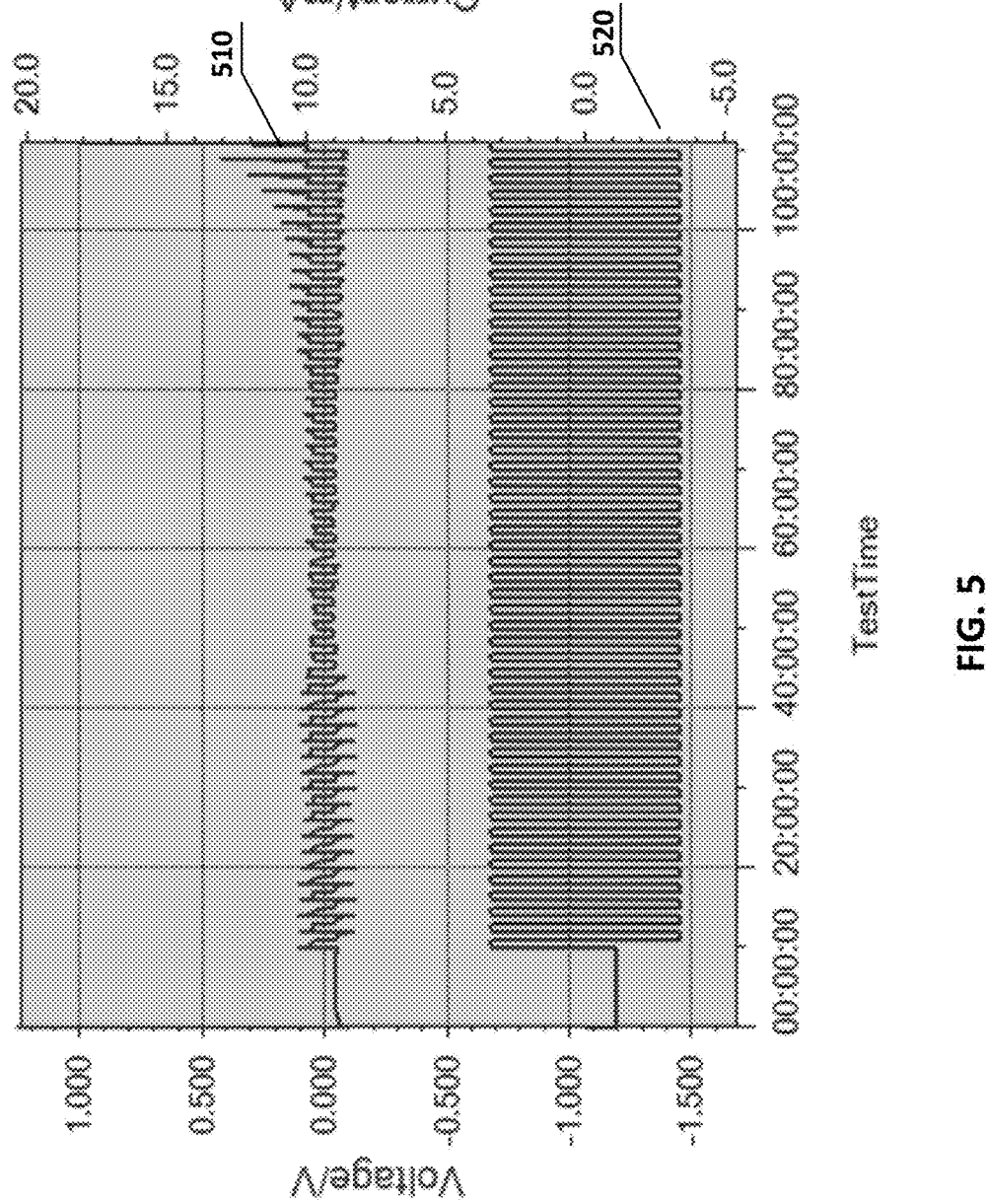
FIG. 5 is a graph displaying the lithium coulombic efficiency of an electrolyte with a hydrophilic fumed silica additive.

FIG. 5 displays a graph of voltage (V) and current (mA) over time, demonstrating the lithium coulombic efficiency of an electrolyte containing 1.45 wt % of a hydrophilic fumed silica demonstrating an LCE of 95.7%. The change in the voltage (V) over time for the electrolyte with 1.45 wt % of hydrophilic fumed silica is demonstrated by line 510. The change in current (mA) over time for the electrolyte with 1.45 wt % of hydrophilic fumed silica is demonstrated by line 520.

Class Three Additives

In the present invention, the electrolyte additive of Class Three Additives includes polymer additives, and concentrations thereof. In some embodiments, Class Three polymer additives may include polyethylene oxide and polypropylene oxide. In a preferred embodiment, a small portion of polymer additives may be added to a liquid electrolyte. A polymer additive may also be a solid solvent that possesses ion transport properties similar to that of a liquid electrolyte solution. In some embodiments, a non-lithium salt Class One Additive may be dissolved into a polymer matrix.

Example 3

An Electrolyte with 1 wt % of Polyethylene Oxide (MW=300 k)

Figure 6:
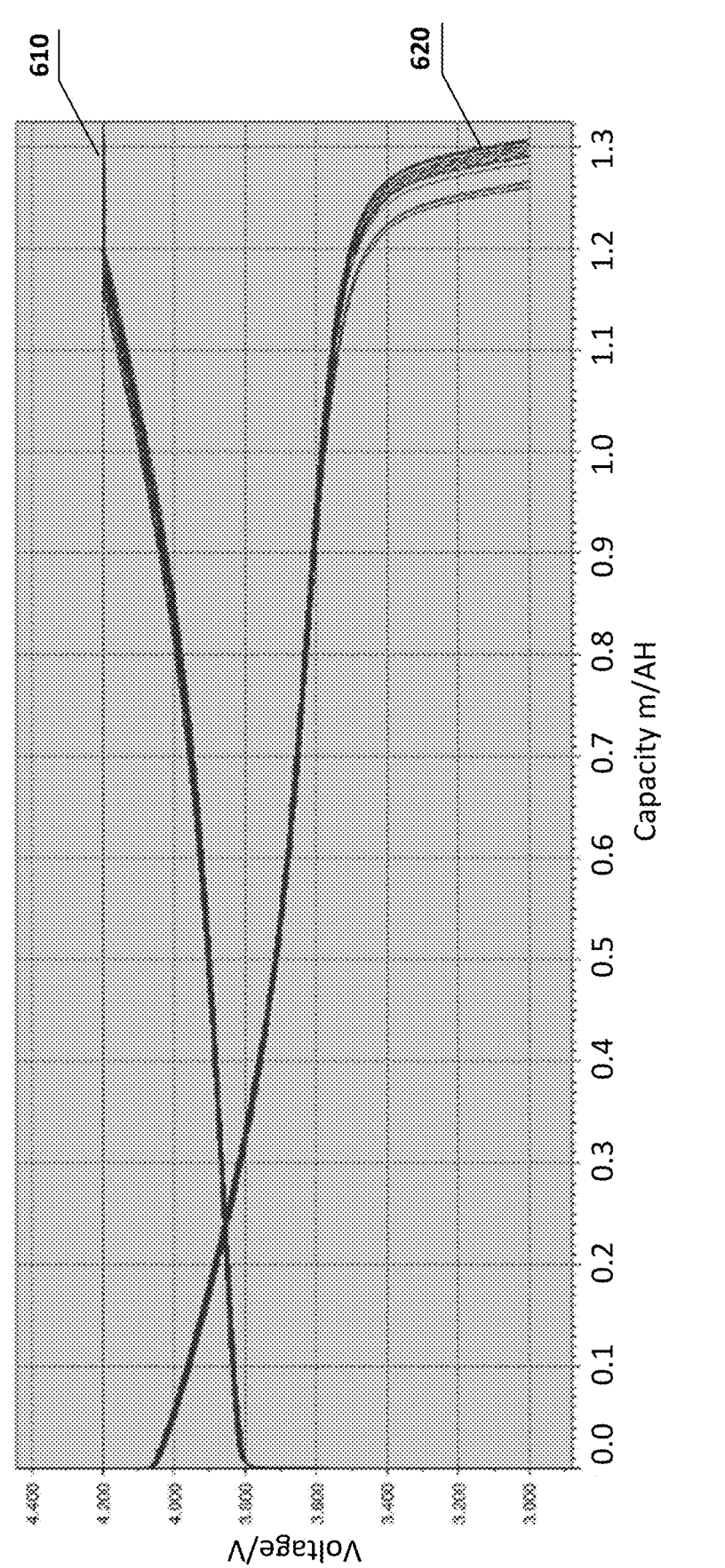
FIG. 6 is a graph displaying improved cycle life with a polyethylene oxide additive.

As demonstrated in FIG. 6, the NCM111/Li cycle life with a polyethylene additive demonstrates improved full cell cycling in a coin cell configuration. The upward curve, line 610, demonstrates the charging profile of voltage (V) versus capacity (mAh) during cycling. The downward curve, line 620, demonstrates the discharge profile of voltage (V) versus capacity (mAh) during cycling. As demonstrated in FIG. 6, after 91 cycles, the capacity and coulombic efficiency was stable at about 100%.

In a preferred embodiment, the highest performance additive may include cesium salt from Class One, silica from Class Two, and polyethylene oxide from Class Three.

Figure 7:
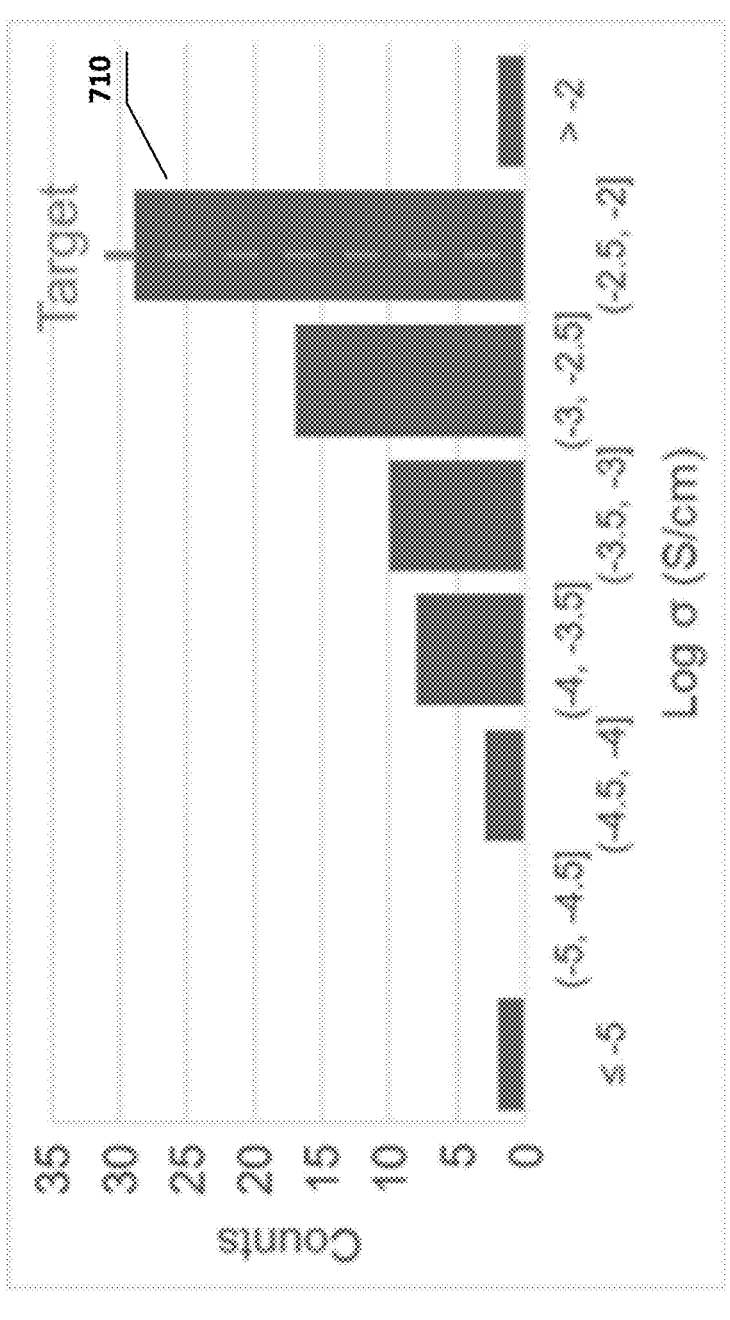
FIG. 7 is a distribution plot of measured ionic conductivity of lithium-ions in a plurality of secondary lithium battery devices.

FIG. 7 demonstrates a distribution plot of measured ionic conductivity S/cm of lithium-ions in a plurality of secondary lithium battery devices. The distribution plot of FIG. 7 demonstrates that most secondary lithium battery devices reached the targeted conductivity range 710. The targeted conductivity range 710 is $5 \times 10^{-3}$ S/cm.

Figure 8:
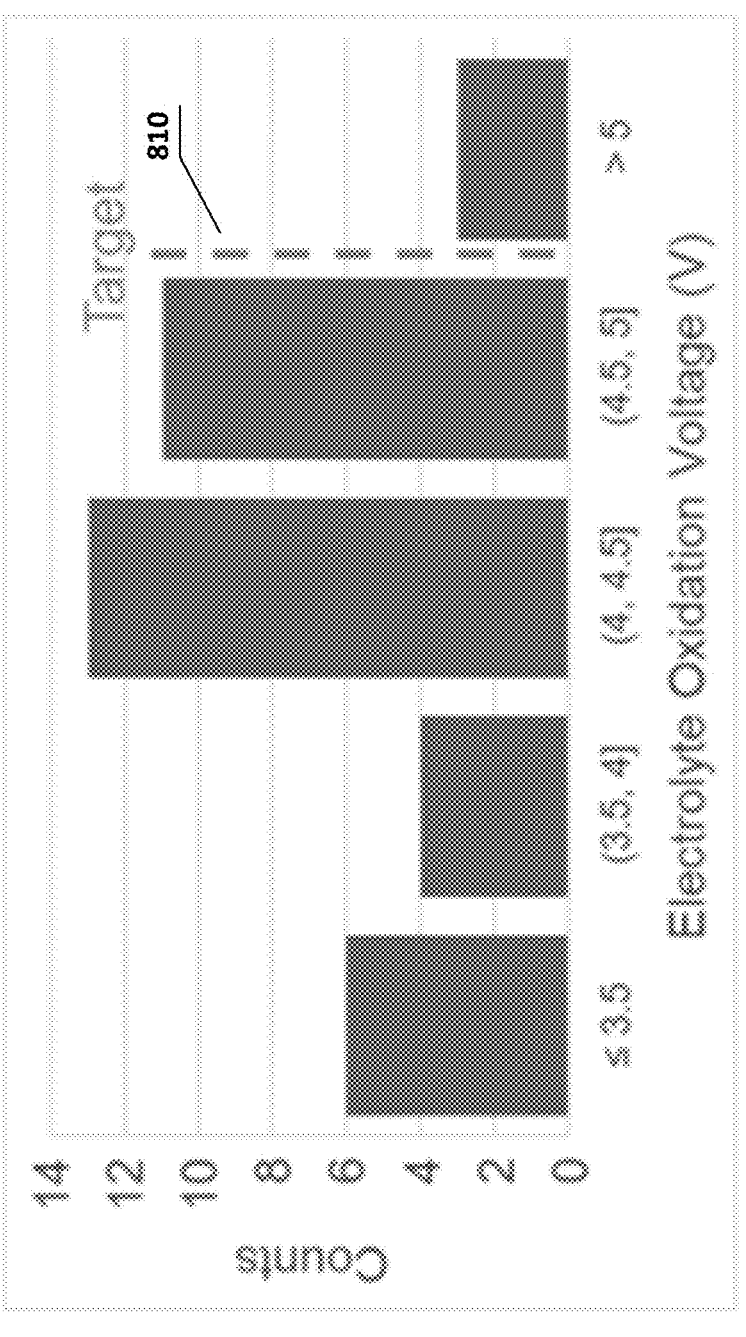
FIG. 8 is a distribution plot of electrolyte oxidation voltage of an electrolyte in a plurality of secondary lithium battery devices at room temperature.

FIG. 8 demonstrates a distribution plot of electrolyte oxidation voltage (V) of the electrolyte in a plurality of secondary lithium battery devices at 25° C. The distribution plot of FIG. 8 demonstrates that most secondary lithium battery devices are below the target range 810 of 5V.

Figure 9:
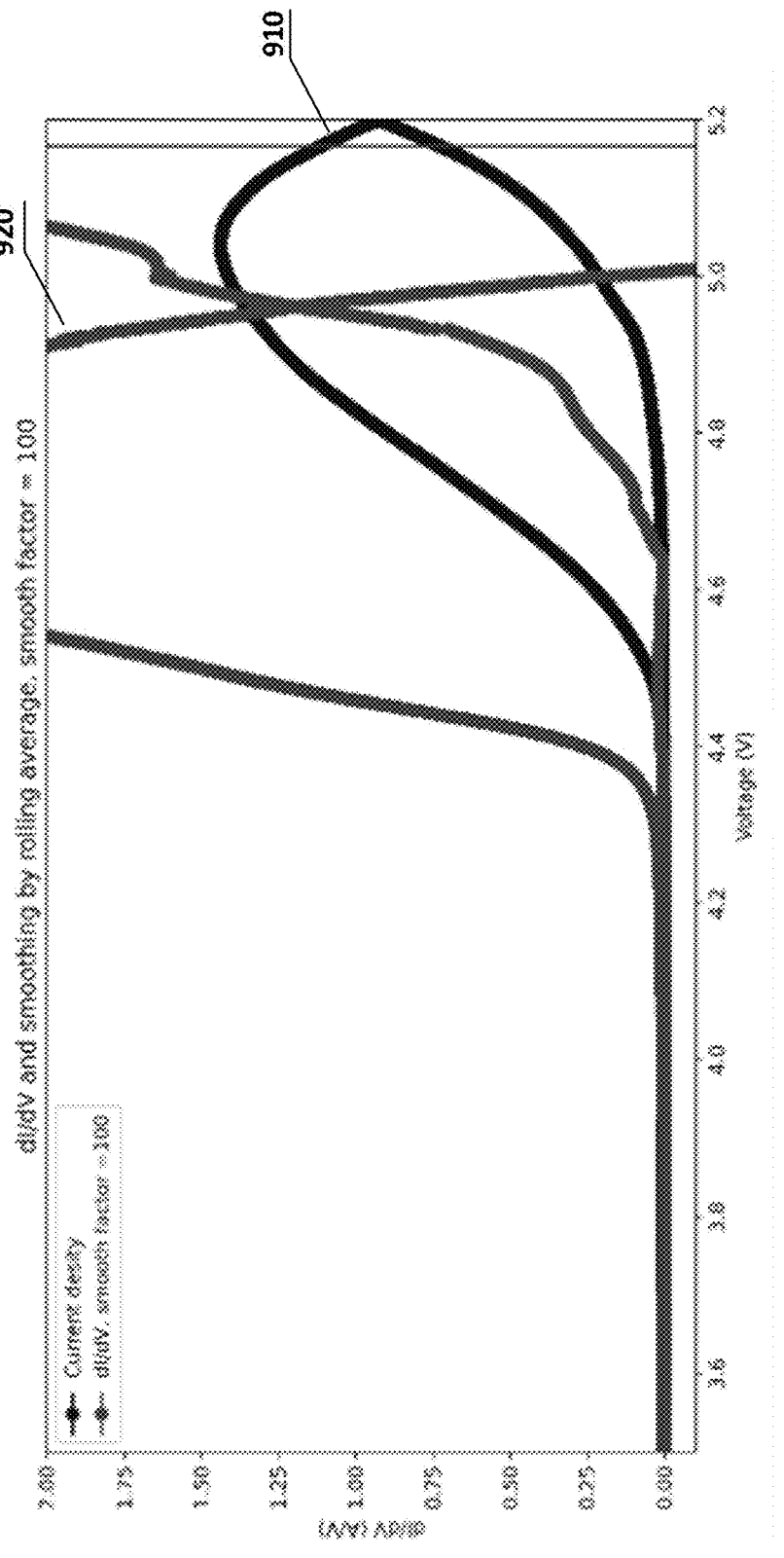
FIG. 9 is a cyclic voltammetry curve of current density and differential capacity used to determine oxidation voltage.

FIG. 9 demonstrates a cyclic voltammetry curve of current density and differential capacity used to determine oxidation voltage. Line 910 demonstrates current density swept over voltage (V). Line 920 demonstrates a differential capacity swept over voltage (V).

Figure 10:
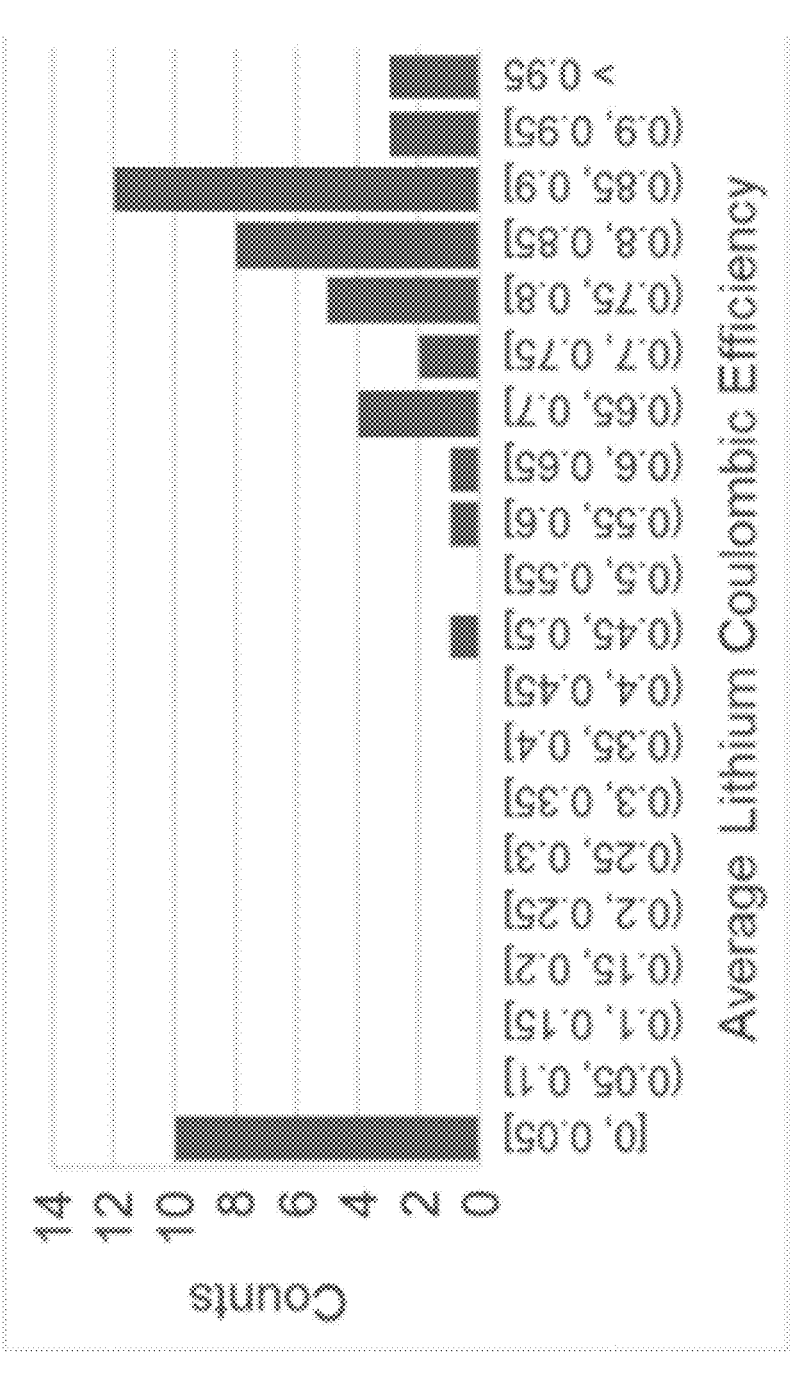
FIG. 10 demonstrates the distribution of average lithium coulombic efficiency of electrolytes in a plurality of secondary lithium devices.

FIG. 10 demonstrates a distribution of average lithium coulombic efficiency of electrolytes in a plurality of secondary lithium devices at 25° C. A significant amount of electrolytes reached efficiencies of above 80% LCE.

In this specification, reference is made in detail to specific embodiments of the invention. Some of the embodiments or their aspects are illustrated in the drawings.

For clarity in explanation, the invention has been described with reference to specific embodiments, however, it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An electrolyte configured for use in a secondary lithium battery, the electrolyte comprising:
one or more lithium salts including at least lithium hexafluorophosphate or lithium trifluoromethylsulfonylimide;
a solvent including at least ethylene carbonate or dimethyl carbonate;
cesium nitrate at about 3 wt % of the electrolyte;
silica at about 0.5 wt % of the electrolyte;
and polyethylene oxide at about 1 wt % of the electrolyte.

2. The electrolyte of claim 1, wherein the ionic conductivity of the electrolyte at 25° C. is 3-15 mS/cm.

3. The electrolyte of claim 1, wherein the voltage window of the electrolyte is 3V to 5.2 V.

4. The electrolyte of claim 1, wherein the water content of the electrolyte is below 400 ppm.

5. The electrolyte of claim 1, wherein the viscosity of the electrolyte is below 1000 cP.

6. A secondary lithium battery electrolyte, comprising:
one or more lithium salts including at least lithium hexafluorophosphate or lithium trifluoromethylsulfonylimide;
a solvent including at least dimethyl carbonate or ethylene carbonate;
cesium nitrate at about 3 wt % of the electrolyte;
fumed silica at about 0.5 wt % of the electrolyte; and
polyethylene oxide at about 1 wt % of the electrolyte.

7. The secondary lithium battery electrolyte of claim 6, wherein an ionic conductivity of the electrolyte at 25° Celsius is 3-15 mSiemens/cm.

8. A secondary lithium battery, comprising:
a positive electrode;
a negative electrode;
a porous separator between the positive electrode and negative electrode; and an electrolyte, including:
one or more lithium salts including at least lithium hexafluorophosphate or lithium trifluoromethylsulfonylimide,
a solvent including at least ethylene carbonate or dimethyl carbonate,
cesium nitrate at about 3 wt % of the electrolyte,
fumed silica at about 0.5 wt % of the electrolyte, and
polyethylene oxide at about 1 wt % of the electrolyte.

9. The secondary lithium battery of claim 8, wherein the secondary lithium battery is characterized by having a cathode loading of 4 mAh/cm$^2$, and has a lithium anode thickness of 30 μm.

10. The secondary lithium battery of claim 8, wherein an ionic conductivity of the electrolyte at 25° Celsius is 3-15 mSiemens/cm.

11. The electrolyte of claim 1, wherein the silica has a particle size of 3-100 nm.

12. The electrolyte of claim 1, wherein the silica is configured to prevent lithium dendrite from spreading from the anode to the cathode in a secondary lithium battery containing the electrolyte.

* * * * *